Patented Apr. 24, 1945

2,374,259

UNITED STATES PATENT OFFICE 2,374,259

TRIAZINE CONDENSATION PRODUCTS AND PROCESS OF MAKING SAME

Otto Albrecht, Neue Welt, near Basel, Charles Graenacher, Riehen, and Richard Sallmann, Bottmingen, Switzerland, assignors to Society of Chemical Industry in Basle, Basel, Switzerland No Drawing. Application May 14, 1941, Serial No. 393,486. In Switzerland March 21, 1940

15 Claims. (Cl. 260—249.5)

It has been found that new condensation products are obtained when methylol compounds, containing at least one radical with at least two carbon atoms, are reacted with methylol derivatives of aminotriazines, their derivatives or functional derivatives, if desired, in the presence of a condensing agent.

As representatives of the methylol compounds of aminotriazines, the methylol compounds of 2,4,6-triamino-1,3,5-triazine, commonly called "melamine," for example, mono-, di-, tri-, tetra-, penta-, or hexamethylolamine, particularly come into question. Furthermore, methylol compounds of those derivatives of melamine which still contain at least one amino group, for example, methylol compounds of melam, melem, ammelin, ammelide, or of halogen substituted aminotriazines, such as 2-chloro-4,6-diamino-1,3,5-triazine, may be used. As functional derivatives of these methylol compounds, use may be made, for example, of the ether-like condensation products obtained by condensation of the methylol compounds mentioned with alcohols, particularly with alcohols of low molecular weight. These condensation products, in which at least one hydroxyl group is etherified by an alcohol, are, for example, described in the French Patent No. 827,014.

As methylol compounds which contain at least one radical with at least two carbon atoms, which are to be condensed with the methylol compound of the aminotriazine, or with its functional derivative, use may be made, for example, of methylol compounds of amides, such as carboxylic acid amides, N-mono-substituted carboxylic acid amides, substituted ureas, urethanes, N:N′-diacylated alkylene or arylene diamines. Examples of functional derivatives of methylol compounds having at least one radical with at least two carbon atoms are, in the present instance, for example, N-halogen-methyl derivatives of amides, such as carboxylic acid amides, also esters of methylol-carboxylic acid amides, such as chloracetates, further halogen-methyl-carboxylic acid esters, α-halogen - methyl - ethers, α-halogenmethyl-thioethers, and halogen-methyl compounds of sulphonic acid amides or of substituted phenols. Particularly valuable products are obtainable if the radical present in these methylol compounds or their functional derivatives contains not merely two but at least 8 carbon atoms. Such a radical of high molecular weight may be aliphatic, cycloaliphatic, mixed aliphatic-cycloaliphatic, aromatic, mixed aliphatic-aromatic, or heterocyclic; it may be substituted or interrupted by other atoms, such as oxygen, sulphur, nitrogen, or by atomic groupings containing these hetero atoms.

Among the amides, from which are derived the methylol compounds or their functional derivatives which, as mentioned in the preceding paragraph, are to be used as parent materials in the present process, the following may be mentioned: amides derived from ammonia or from primary amines, such as methylamine, ethylamine, dodecylamine, cyclohexylamine, or aniline, and from carboxylic acids, such as acetic, chloroacetic, butyric, capric, lauric, stearic, behenic, oleic, or α-bromolauric acids, as well as naphthenic and resinic acids; substituted ureas, such as monododecyl urea; urethanes, such as are obtainable, for example, from chloroformic acid esters of alcohols of high molecular weight with ammonia or primary amines; secondary amides, such as dilauric amide; furthermore N:N′-diacylated alkylene or arylene diamines, for example, N:N′-diacylated methylene diamines, such as methylene di-stearic acid amide, or methylene diurethanes, for example, those which are available by analogous processes from carbamic acid esters of alcohols of high molecular weight.

The methylol compounds of the amides mentioned in the previous paragraph are either known or may be directly prepared by analogous processes, for example, by heating with paraformaldehyde to about 100–110° C. in the presence of basic substances, such as tertiary amines.

The N-halogen-methyl derivatives of amides, mentioned as parent substances in the third paragraph, may be obtained from the amides with the help of formaldehyde and halogen hydrides, in known manner.

It is particularly advantageous to use as N-halogen-methyl derivatives the condensation products obtainable by the action of α:α′-dihalogendialkyl-ethers, such as α:α′-dichlorodimethyl-ether or α:α′-dibromodimethyl-ether, on the amides. These may be obtained by reacting the α:α′-dichlorodialkyl-ether (preferably about 1.5 molecule for every amido group) with the amides at raised temperature, preferably at about 90–100° C. The action of the α:α′-dihalogendimethylethers on the primary carboxylic acid amides yields, first of all, N:N′-diacylated methylenediamines, which are converted into the corresponding N:N′-dihalogenmethyl derivatives of the N:N′-diacylated methylene-diamines by the further action of the α:α′-dihalogen-dimethylethers.

The chloromethyl carboxylic acid esters, also mentioned in the third paragraph as parent materials, among which mention may be made, for example, of the stearic acid chloromethyl ester, may be obtained in a similar manner to the chloromethyl esters of carboxylic acids of low molecular weight already known. Thus, for example, the corresponding carboxylic acid halides, such as stearic acid chloride, may be heated with paraformaldehyde in the presence of zinc chloride. The α-halogenmethyl ethers and α-halogenmethyl thioethers, also mentioned as parent materials in the third paragraph, among which mention may be made of chloromethyl-octadecyl ether and chloromethyl-lauryl thioether, may likewise be prepared by analogous processes, should they not be described in the literature. In a similar manner, the halogenmethyl compounds of sulphamides or of substituted phenols, for example, the chloromethyl compounds of hexadecylsulphamide or of iso-octylphenol, may also be prepared in the usual manner by means of paraformaldehyde and halogen hydrides.

The esters of methylol compounds, for example, the chloroacetates, which are introduced in the third paragraph as functional derivatives of methylol compounds, may be obtained by treating the corresponding chloromethyl compounds with carboxylic acid salts, such as sodium chloroacetate, preferably in the presence of acetone.

The reaction between the methylol compounds of the aminotriazines (or their functional derivatives) and the methylol compounds containing at least one radical with at least two carbon atoms, which is preferably carried out in the presence of a condensing agent, such as hydrogen chloride, concentrated sulphuric acid, glacial acetic acid, may be carried out by mixing at room temperature, preferably in the presence of solvents, such as acetone, methylene chloride, dioxane, chloroform, carbon tetrachloride, or benzene. By heating—preferably to about 50–100° C.—the speed of the reaction can be increased.

The reaction between the methylol compounds of the aminotriazines (or their functional derivatives) and the functional derivatives of the methylol compounds containing at least one radical with at least two carbon atoms may also be carried out by mixing at room temperature or at a slightly raised temperature, for example, at 40–60° C., preferably in the presence of the solvents already mentioned.

The products of the present invention, insofar as they have been prepared from suitable parent materials, may serve, among other ways as auxiliary products, for example, in the textile, leather and paper industries. Condensation products which contain an aliphatic or cycloaliphatic radical of high molecular weight may find application as softening agents and as agents for the production of water-repellent effects. The solubility or dispersibility of the products of the present invention in water may be increased by the addition of hydrotropic substances, for example, by addition of urea, thiourea, as well as by the addition of capillary active substances, such as salts of diethylaminoethyl-oleyl-amide.

The particular interest of the products of the present invention lies in their property of dissociating when heated or treated with saponifying agents, when insoluble substances are deposited. If this dissociation should take place on a substrate, such as a textile product (which could consist of cellulose, or of animal fibres), these insoluble bodies will be deposited thereon in a strongly adhering form. According to the nature of the substances deposited, it can endow the fibre with definite, valuable properties. Among these must be emphasized the property of waterproofness or water-repellency, if desired combined with particular softness and fullness of handle. Condensation products which contain an alkyl radical with 16–18 carbon atoms as the radical of high molecular weight are particularly suitable for making textiles water-repellent in a form fast to washing. To this end, the impregnated material, preferably dried at a low temperature, is heated for a short time, for example, to 110–140° C. In many cases it is also advisable to add aluminium salts, for instance aluminium formate, to the aqueous impregnating liquors. In this way a higher degree of water-repellency, more particularly a reduction of the superficial wetting properties (shown by an improvement in the drop test), may be obtained.

The composition of the products of the present invention could not be determined with accuracy. The products, which may be liquid or solid substances, soluble or dispersible in water, may therefore only be characterized by the processes of their preparation.

The products of the present invention may be used alone or, as already partially intimated, together with other substances, such as salts, particularly with salts of weak acids, such as sodium acetate or aluminium acetate. They may also be used in conjunction with hydrocarbons, such as paraffin; with solvents, soaps, soap-like substances, methylolamides, protective colloids, finishing or delustring agents—such as methylolureas—weighting or softening agents and the like.

*Example 1*

40 parts of α:α'-dichlorodimethylether and 24 parts of the amide obtained from hardened whale oil fatty acids, which contains stearic acid amide as its principal constituent, and which should be broken up as small as possible, are heated together whilst stirring, with exclusion of moisture, in a bath at 90–100° C. A solution is first formed from which insoluble portions gradually separate, the reaction mixture becoming thicker. When the reaction mass has again become thin-flowing, a further 48 parts of the amide obtained from hardened whale oil fatty acids, also in finely broken form, are gradually added. The period of time during which it is introduced may amount, for example, to ½–1 hour. After stirring for a further 1–3 hours in a bath at 90–100° C., the reaction is ended; this may be recognized by the fact that a sample of the reaction mass, warmed for a short time with pyridine, yields a clear solution in lukewarm water which foams on shaking. Thereupon, any remaining volatile portions of the reaction product, most particularly hydrogen chloride, are driven off under reduced pressure. The chloromethyl derivative of the hardened whale oil fatty acids thus prepared, which forms a waxy mass which is decomposed by water, is dissolved in 200 parts by volume of dry acetone and separated from the small residue of an insoluble impurity, which is deposited on the bottom of the vessel, and 34.3 parts of finely powdered, completely anhydrous sodium chloroacetate. The reaction mixture is first stirred intensively for about 20 hours at room temperature, then for about 4 hours at 40–45° C. After this time the chloromethyl derivative of the hardened whale oil fatty acid amide—the main constituent of this chloromethyl derivative is to be designated as the N:N'- dichloromethyl derivative of N:N'-distearoyl methylenediamine—has reacted almost completely with the sodium chloroacetate, with separation of sodium chloride, with the formation of the corresponding chloracetic acid ester. The reaction mass is then diluted with 288 parts by volume of acetone, 144 parts of finely powdered hexamethylol melamine are added in portions whilst stirring and stirring is continued for a further 4 hours at 40–45° C., when the solvent is removed at low temperature, preferably under reduced pressure. A solid, almost colorless mass is obtained which, when dissolved or suspended in a small quantity of alcohol and poured into warm water, gives an opalescent solution or suspension.

The reactions involved in the foregoing may be conceived to proceed as follows:

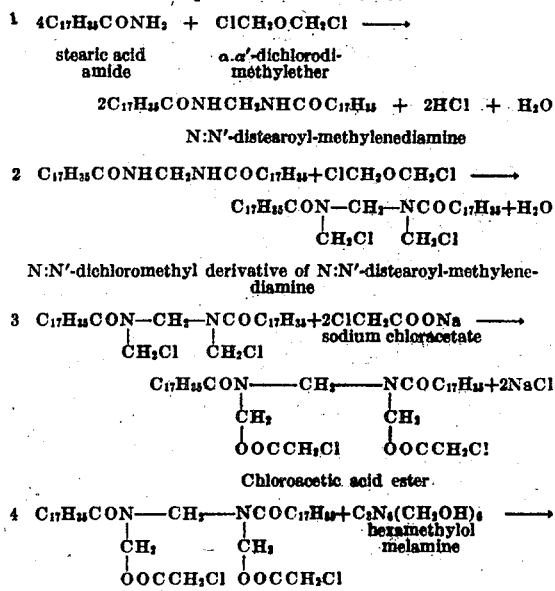

1  $4C_{17}H_{35}CONH_2 + ClCH_2OCH_2Cl \longrightarrow$ stearic acid    α.α'-dichlorodi-
   amide          methylether $2C_{17}H_{35}CONHCH_2NHCOC_{17}H_{35} + 2HCl + H_2O$ N:N'-distearoyl-methylenediamine 2  $C_{17}H_{35}CONHCH_2NHCOC_{17}H_{35}+ClCH_2OCH_2Cl \longrightarrow$ N:N'-dichloromethyl derivative of N:N'-distearoyl-methylenediamine 3  ...+2ClCH_2COONa → sodium chloroacetate Chloroacetic acid ester 4  ...+ C_3N_6(CH_2OH)_6 → hexamethylol melamine hexamethylol melamine condensation product.

The new product can be used as follows to make textiles water-repellent and soft in a fast-to-washing form.

1 part of the condensation product described above is suspended in 4 parts by volume of alcohol on the water bath and is then added, with good stirring, to 45 parts of water at 45° C. containing 0.25 part by volume of concentrated formic acid. Cotton poplin is twice saturated in this bath and is squeezed so as to retain its own weight of liquor. It is then dried as quickly as possible at low temperature, preferably at about 65° C., and the carefully dried fabric is heated for about 10 minutes to 125–145° C. The material, after being treated thus, is excellently soft and water-repellent, and these properties are scarcely affected by washing or by treating the material with carbon tetrachloride.

In a similar manner, palmitic acid amide may be used as parent material in place of the amide obtained from hardened whale oil fatty acids.

Example 2

72 parts of stearic acid amide are reacted with α:α'-dichloro-dimethylether and, thereupon, with sodium chloroacetate, according to the process described in Example 1. In this manner, the corresponding chloracetic acid ester is obtained from the N:N'-dichloromethyl derivative of the N:N'-distearoyl methylenediamine. 144 parts of the condensation product obtained from hexamethylol melamine and methyl alcohol (in which about 2 hydroxyl groups are etherified with methyl alcohol), described in Example 2 of Swiss Patent No. 206,608, are now added to the suspension in acetone thus obtained. The reaction mixture is stirred for 4 hours at 40–45° C., when the solvent is evaporated at low temperature. The condensation product thus formed is a solid, almost colorless mass which, after stirring with hot ethyl alcohol, may be dissolved or dispersed in warm water, which preferably contains a small quantity of formic acid.

The new condensation product may be used as described in Example 1 to make textiles soft and water-repellent in a form fast to washing.

The corresponding product containing ethyl alcohol may replace the condensation product obtained from hexamethylolmelamine and methyl alcohol. In a similar manner, stearic acid amide may be replaced by acetamide, lauric acid amide, palmitic acid amide, or carbamic acid octadecyl ester.

Example 3

72 parts of the amide obtained from hardened whale oil fatty acids, containing stearic acid amide as its important constituent, are treated, according to the instructions given in Example 1, with α:α'-dichlorodimethyl ether, and the reaction product is dissolved in 384 parts by volume of acetone without preliminary removal of volatile matter. This solution contains as its most important constituent the N:N'-dichloromethyl derivative of N:N' - distearoylmethylenediamine. Hereupon, 144 parts of the condensation product obtained from hexamethylolmelamine and methyl alcohol (in which about 2 hydroxyl groups are etherified with methyl alcohol), described in Swiss Patent No. 206,608, are introduced, and the reaction mixture is stirred for 4 hours at 40–45° C., after which the solvent is evaporated at a low temperature. The condensation product thus formed is a readily pulverized, almost colorless, solid mass is almost completely soluble in hot alcohol and, on introducing the alcoholic solution into warm water weakly acidified with formic acid, an opalescent solution is obtained. It may also be used as described in Example 1 to produce fabrics which are soft and water-repellent in a fast to washing form.

Example 4

72 parts of the amide obtained from hardened whale oil fatty acids are reacted with α:α'-dichlorodimethyl ether and then with sodium chloroacetate, according to the instructions given in Example 1. To the suspension in acetone thus obtained 101 parts of trimethylolmelamine are added, and this reaction mixture is stirred for 4 hours at 40–45° C., after which it is freed from solvent at a low temperature. The new condensation product is obtained in the form of a solid mass which, after stirring with hot alcohol, may be suspended in warm water which has been weakly acidified.

Trimethylol - 2 - chloro-4,6-diamino-1,3,5-triazine or a methylol compound of melam may replace the trimethylolmelamine in this example.

Example 5

A warm solution of 1.1 parts of the condensation product described in Example 2 of Swiss Patent No. 206,608 in 3 parts by volume of glacial acetic acid is added to a solution of 1 part of stearic acid methylolamide in 3 parts by volume of warm glacial acetic acid, and the mixture is maintained at 60–65° C. for 2 hours. After distilling off the solvent at low temperature under reduced pressure the condensation product is obtained as a solid mass.

What we claim is:

1. A process for the manufacture of a condensation product, which consists in reacting a member of the group consisting of the N-methylol carboxylic acid monoamides, esters of N-methylol carboxylic acid monoamides with α-chloro-substituted carboxylic acids, and N-halogen-methyl-substituted amides and containing a radical with two to about eighteen carbon atoms, with a methylol-aminotriazine in a solvent medium at a temperature ranging from room temperature to about 100° C. until condensation takes place, and then terminating the reaction.

2. A process for the manufacture of a condensation product, which consists in reacting an ester of an aliphatic carboxylic acid methylol-amide with an α-chloro-substituted carboxylic acid, said ester containing a radical with two to about eighteen carbon atoms, with a methylol-melamine in a solvent medium at a temperature of about 40–100° C. until condensation takes place, and then terminating the reaction.

3. A process for the manufacture of a condensation product, which consists in reacting an ester of an aliphatic carboxylic acid methylol-amide with an α-chloro-substituted carboxylic acid, said ester containing a radical with twelve to about eighteen carbon atoms, with a methylol-melamine in which an hydroxy group is etherified with an aliphatic alcohol of low molecular weight, in a solvent medium at a temperature of about 40–100° C. until condensation takes place, and then terminating the reaction.

4. A process for the manufacture of a condensation product, which consists in reacting an ester of an aliphatic carboxylic acid methylol-amide with an α-chloro-substituted carboxylic acid, said ester containing a radical with fourteen to about eighteen carbon atoms, with a hexamethylol-melamine in which an hydroxy group is etherified with methylol alcohol, in a solvent medium at a temperature of about 40–100° C. until condensation takes place, and then terminating the reaction.

5. A process for the manufacture of a condensation product, which consists in reacting a N:N'-dichloro-methyl-substituted N:N'-distearoyl-methylenediamine with a hexamethylol-melamine in which more than one hydroxy group is etherified with methyl alcohol, in a solvent medium at a temperature of 40–100° C. until condensation takes place, and then terminating the reaction.

6. A process for the manufacture of a condensation product, which consists in reacting the chloracetic acid ester obtained by treating the N:N'-dichloromethyl-substituted N:N'-distearoyl-methylenediamine with sodium chloroacetate, with a hexamethylol-melamine in which more than one hydroxy group is etherified with methyl alcohol in a solvent medium at a temperature of 40–100° C. until condensation takes place, and then terminating the reaction.

7. A process for the manufacture of a condensation product, which consists in reacting an ester of an aliphatic carboxylic acid methylol amide with an α-chloro-substituted carboxylic acid, said ester containing a radical with fourteen to about eighteen carbon atoms, with hexamethylol-melamine in which more than one hydroxy group is etherified with methyl alcohol, in a solvent medium at a temperature of 40–100° C. until condensation takes place, and then terminating the reaction.

8. A process for the manufacture of a condensation product, which consists in reacting the chloracetic acid ester obtained by treating the N:N'-dichloromethyl-substituted N:N'-distearoyl-methylenediamine with sodium chloroacetate, with hexamethylol-melamine in which more than one hydroxy group is etherified with methyl alcohol, in a solvent medium at a temperature of 40–100° C. until condensation takes place, and then terminating the reaction.

9. The product obtained by the process which consists of reacting a member of the group consisting of the N-methylol carboxylic acid monoamides, esters of N-methylol carboxylic acid monoamides with α-chloro-substituted carboxylic acids, and N-halogenmethyl-substituted amides and containing a radical with two to about eighteen carbon atoms, with a methylol-aminotriazine in a solvent medium at a temperature ranging from room temperature to about 100° C. until condensation takes place and then terminating the reaction before resin formation can take place, which product is a liquid to solid substance soluble or dispersible in water.

10. The product obtained by reacting an ester of an aliphatic carboxylic acid methylolamide with an α-chloro-substituted carboxylic acid, said ester containing a radical with two to about eighteen carbon atoms, with a methylol-melamine in a solvent medium at a temperature of about 40–100° C. until condensation takes place and then terminating the reaction before resin formation can take place, which product is a liquid to solid substance soluble or dispersible in water.

11. The product obtained by reacting an ester of an aliphatic carboxylic acid methylolamide with an α-chloro-substituted carboxylic acid, said ester containing a radical with two to about eighteen carbon atoms, with a methylol-melamine in which an hydroxy group is etherified with an aliphatic alcohol of low molecular weight, in a solvent medium at a temperature of about 40–100° C. until condensation takes place and then terminating the reaction before resin formation can take place which product is a liquid to solid substance soluble or dispersible in water.

12. The product obtained by reacting a N:N'-dichloromethyl-substituted N:N'-distearoyl-methylenediamine with a hexamethylol-melamine in which more than one hydroxy group is etherified with methyl alcohol, in a solvent medium at a temperature of about 40–100° C. until condensation takes place and then terminating the reaction before resin formation can take place which product is a liquid to solid substance soluble or dispersible in water.

13. The product obtained by reacting the chloroacetic acid ester obtained by treating the N:N'-dichloromethyl-substituted N:N'-distearoyl-methylenediamine with sodium chloroacetate, with a hexamethylol-melamine in which more than one hydroxy group is etherified with methyl alcohol, in a solvent medium at a temperature of about 40–100° C. until condensation takes place and then terminating the reaction before resin formation can take place which product is a solid substance which may easily be dispersed in hot water acidified with formic acid after treating it with hot ethyl alcohol and which renders textiles soft and water-repellent.

14. The product obtained by reacting an ester of an aliphatic carboxylic acid methylolamide with an α-chloro-substituted carboxylic acid, said ester containing a radical with fourteen to about eighteen carbon atoms, with hexamethylol-melamine, in a solvent medium at a temperature of about 40-100° C. until condensation takes place and then terminating the reaction before resin formation can take place which product is a liquid to solid substance soluble or dispersible in water.

15. The product obtained by reacting the chloracetic acid ester obtained by treating the N:N'-dichloromethyl - substituted N:N'- distearoyl - methylenediamine with sodium chloroacetate, with hexamethylol-melamine, in a solvent medium at a temperature of about 40-100° C. until condensation takes place and then terminating the reaction before resin formation can take place which product is a solid substance which may easily be dispersed in hot water after treating it with hot ethyl alcohol and which renders textiles soft and water-repellent.

OTTO ALBRECHT.
CHARLES GRAENACHER.
RICHARD SALLMANN.